United States Patent [19]

Wacks et al.

[11] 3,966,317

[45] June 29, 1976

[54] DRY PROCESS PRODUCTION OF ARCHIVAL MICROFORM RECORDS FROM HARD COPY

[75] Inventors: Harvey H. Wacks, Southfield; Peter H. Klose, Troy; Stanford R. Ovshinsky, Bloomfield Hills, all of Mich.; Robert W. Hallman, San Diego, Calif.

[73] Assignee: Energy Conversion Devices, Inc., Troy, Mich.

[22] Filed: Apr. 8, 1974

[21] Appl. No.: 458,715

[52] U.S. Cl. ............................ 355/19; 355/64; 355/99
[51] Int. Cl.² ............... G03B 27/00; G03B 27/02; G03B 27/32
[58] Field of Search .............. 355/5, 15, 17, 54, 77, 355/99, 64, 27

[56] References Cited
UNITED STATES PATENTS

| | | | |
|---|---|---|---|
| 2,855,834 | 10/1958 | Doster | 355/99 |
| 3,051,044 | 8/1962 | McNaney | 355/5 |
| 3,155,022 | 11/1964 | Schwertz | 355/5 |
| 3,207,051 | 9/1965 | Cooper | 354/17 |
| 3,570,380 | 3/1971 | Kamenstein | 354/15 |
| 3,778,151 | 12/1973 | Zimmet | 355/54 |

*Primary Examiner*—Richard A. Wintercorn
*Attorney, Agent, or Firm*—Wallenstein, Spangenberg, Hattis & Strampel

[57] ABSTRACT

A dry-process method and apparatus for producing archival microform records from light reflecting hard copy utilize a dry-process mask film strip which is photosensitive to and microimaged by light reflected and reduced or condensed from the hard copy and developed by heat to provide microimaged transparencies therein as the mask film strip is moved to an imaging and developing station. It also utilizes a dry-process microform film which has archival properties and which is sensitive to and microimaged and developed by short pulses of electromagnetic energy above a threshold value applied thereto through the microimaged transparencies of the superimposed mask film strip when it is moved to an image transferring station to provide in the microform film imaged microform records which conform to the transparent microimages in the dry-process mask film strip and, hence, the hard copy and which have achival properties. The microform film is preferably in the form of a microfiche.

18 Claims, 25 Drawing Figures

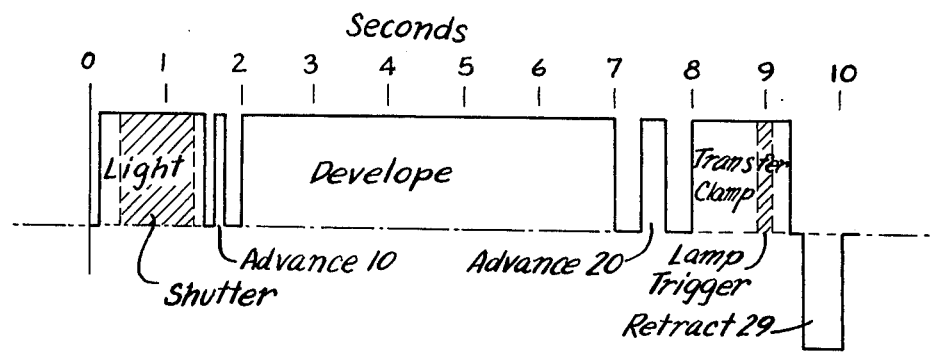
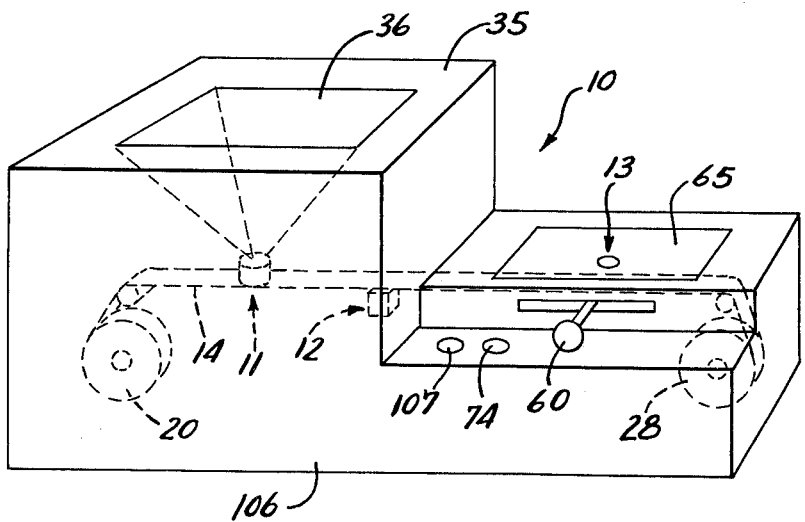
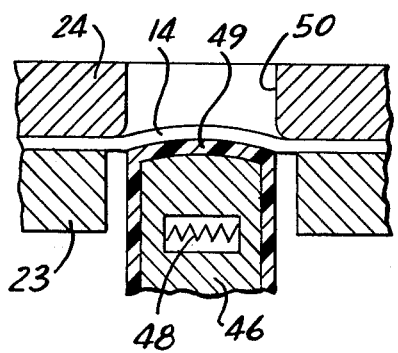
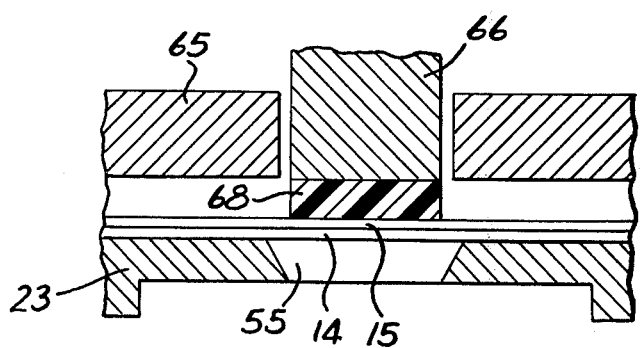

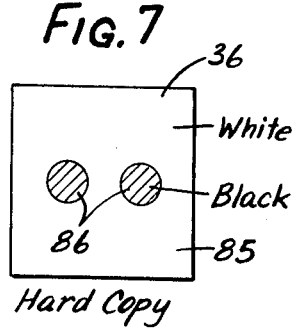
FIG.7 — Hard Copy
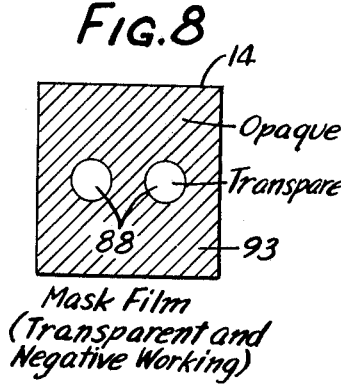
FIG.8 — Mask Film (Transparent and Negative Working)
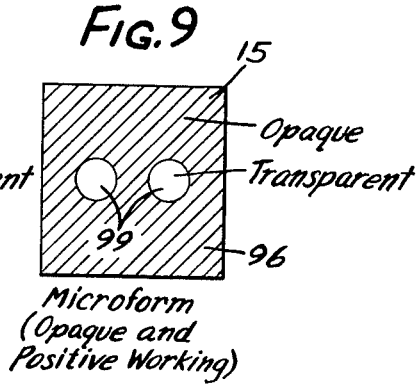
FIG.9 — Microform (Opaque and Positive Working)
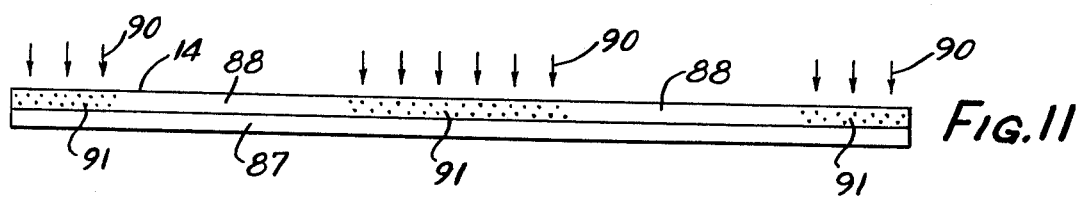
FIG.10
FIG.11
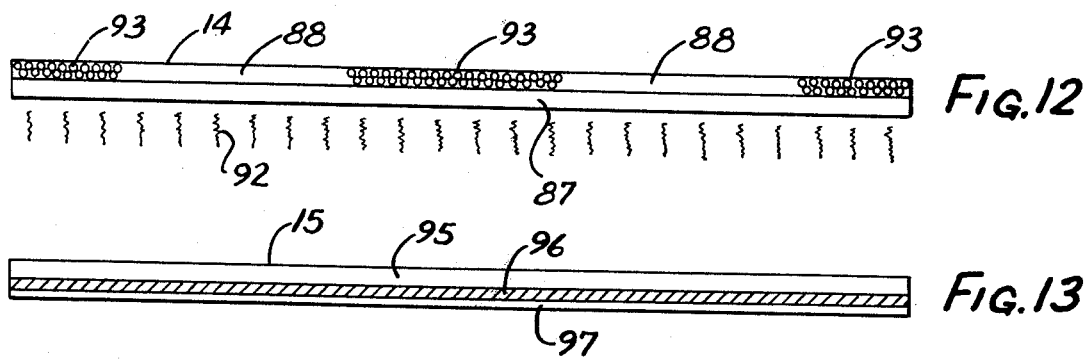
FIG.12
FIG.13
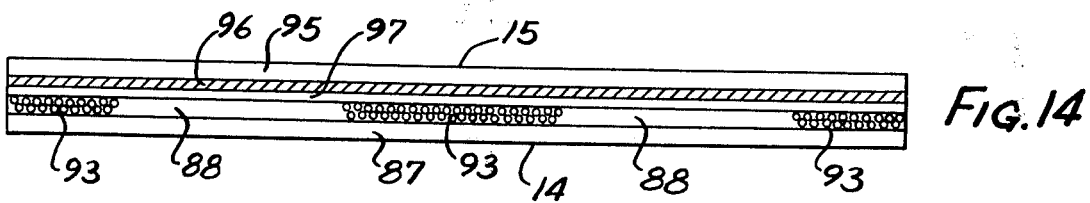
FIG.14
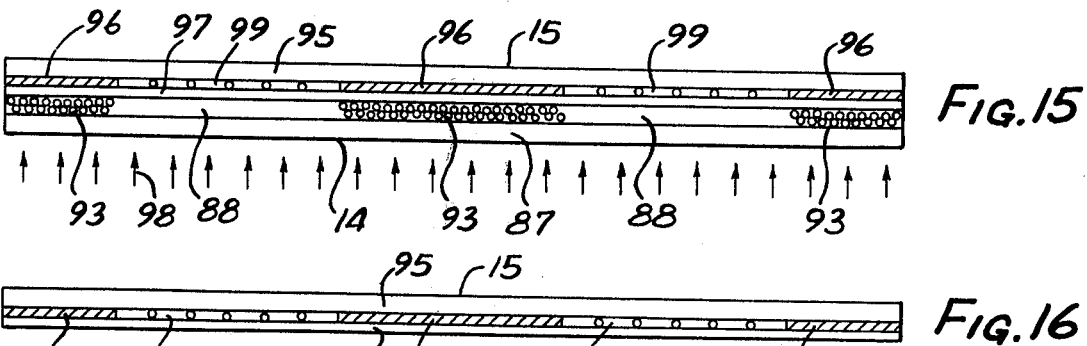
FIG.15
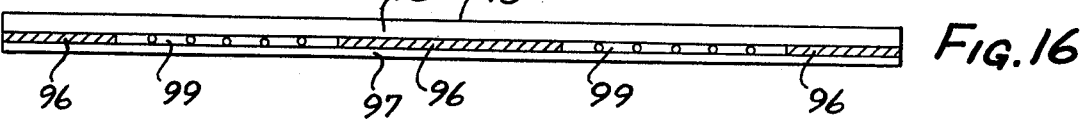
FIG.16

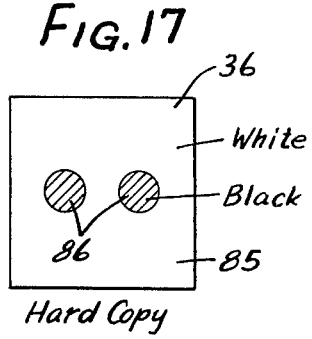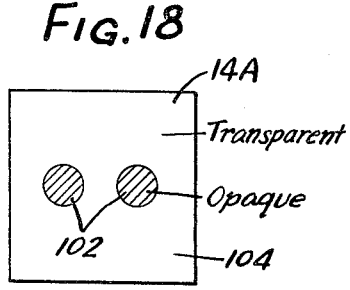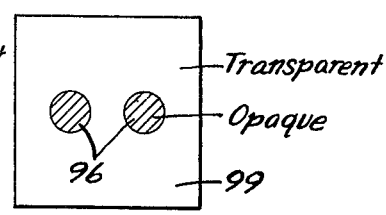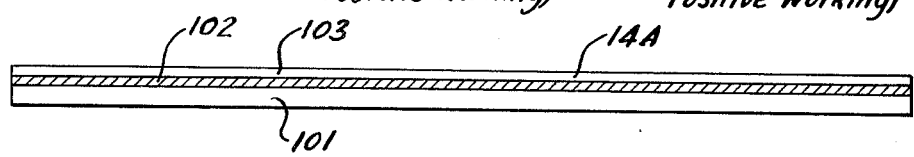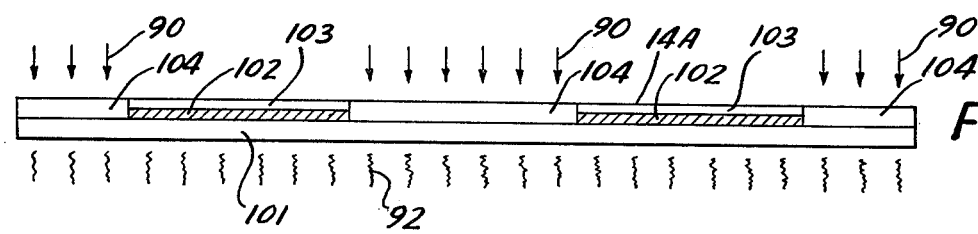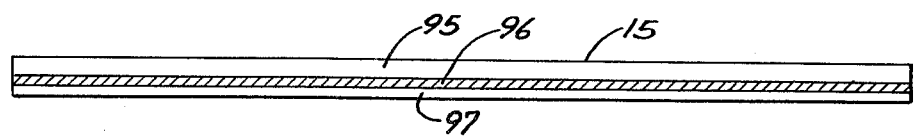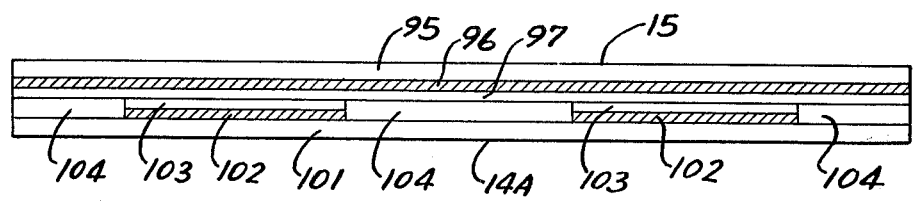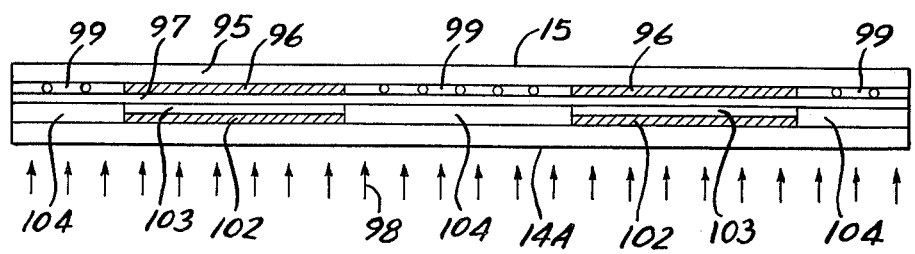

DRY PROCESS PRODUCTION OF ARCHIVAL MICROFORM RECORDS FROM HARD COPY

This invention relates to a method and apparatus for producing microform records from light reflecting hard copy (such as printed documents and the like). Various manners for so doing have been proposed and utilized in the past, but they have either required wet development or processing steps, and/or failed to provide the microform records with adequate resolution or contrast or archival properties, i.e. the maintainance of the integrity of the microform records over many years, regardless of the deleterious effects of light, temperature, moisture, degradation, or the like thereon.

For example, the usual silver halide films used for producing microform records from light reflecting hard copy require wet developing and processing, are quite grainy in structure, have relatively poor resolution and contrast when viewed in a viewer, and are somewhat lacking in good archival properties. The more recent dry silver films developed by 3M Company which can be dry developed and processed (utilizing light sensitive silver halide and being developed by heat) and which can be used for producing microform records from light reflecting hard copy are also quite grainy in structure, have relatively poor resolution and contrast, and have archival properties which are considerably inferior to those of the wet processed silver halide films.

The principal object of this invention is to provide an improved method and apparatus for producing microform records from light reflecting hard copy, which utilize a completely dry-process operation eliminating the need for wet developing and processing steps, which provide microform records which are not grainy and which have sharp resolution and high contrast and which have excellent archival properties so as not to be deleteriously affected by light, temperature, moisture, degradation or the like over a period of many years, which are simple and straightforward in use and particularly adaptable for in line continuous and repetitive use, and which are capable of dry-process table or desk top use.

Briefly, the dry-process method and apparatus of the invention for producing archival microform records from light reflecting hard copy utilize a dry-process mask film strip which is photosensitive to and imaged by light and dry developed by heat to provide imaged transparencies therein. Such a dry-process mask film strip is advanced or moved to an imaging and developing station and an image transferring station. Light is applied to the hard copy to be reflected thereby and the light image reflected from the hard copy is reduced or condensed to microimage size and applied at the imaging and developing station to the dry-process mask film strip to produce microimages of the hard copy in the dry-process mask film strip as it is advanced or moved to the imaging and developing station. The dry-process mask film strip is also heated as it is advanced or moved to the imaging and developing station for developing the microimages into microimage transparencies.

The method and apparatus also utilize a dry-process microform film which has achival properties and which is sensitive to and imaged and developed by short pulses of electromagnetic energy above a threshold value applied thereto to provide imaged records which have sharp resolution, high contrast and excellent archival properties, The dry-process microform film and the dry-process mask film strip are superimposed in the image transferring station as the latter is advanced or moved to the image transferring station. Short pulses of electromagnetic energy above a threshold value are applied in the image transferring station through the transparent microimaged dry-process mask film strip onto the dry-process microform film for providing in the dry-process microform film imaged microform records which conform to the transparent microimages in the dry-process mask film strip and which have the aforementioned sharp resolution, high contrast and archival properties.

The dry-process mask film strip comprises a thin substantially transparent flexible film substrate formed from a suitable plastic material and a film deposited thereon which is photosensitive to and imaged by reflected light and dry developed by heat to provide imaged transparencies therein. The photosensitive material may be initially substantially transparent and be negative working so that the substantially transparent photosensitive material is made substantially opaque where it is activated by the reflected light to provide negative transparent images or transparencies. On the other hand, the photosensitive material may be initially substantially opaque and be positive working so that the substantially opaque photosensitive material is made substantially transparent where it is activated by the reflected light to provide positive transparent images or transparencies.

The dry-process microform film comprises a flexible substrate and a continuous substantially opaque film deposited thereon which has archival properties and which is sensitive to and imaged and developed and made substantially transparent by dispersion of the continuous substantially opaque film where the short pulses of electromagnetic energy above the threshold value are applied thereto. The continuous substantially opaque film is therefore positive working to provide positive images. Preferably, the flexible substrate is a thin substantially transparent film formed from a suitable plastic material so as to provide transparencies which can be viewed in the transmission mode. On the other hand, the flexible substrate may be a light reflecting film, formed from white reflecting paper or the like, to provide images which can be viewed in the reflection mode.

Where the dry-process mask film strip is negative working as discussed above, the image produced in the dry-process microform film will be a negative microimage of the hard copy, and where the dry-process mask film strip is positive working as discussed above, the image produced in the dry-process microform film will be a positive microimage of the hard copy.

While in accordance with the broader aspects of this invention the dry-process microform film may be in the form of a microfilm strip to which microimages may be transferred, preferably, and in accordance with the more specific aspects of this invention, the dry-process microform film is in the form of a microfiche or microform card. Initial information may be transferred at desired frames or points to the microfiche or microform card and, later, additional information may be transferred at other desired frames or points to the microfiche or microform card, the microfiche or microform card having "add-on" capabilities and being updatable. As a result, a records manager is able to file microimages of records in the same manner of organization as paper files, with all the advantages of microfilm files.

In this latter respect, the microfiche or microform card can, in accordance with this invention, be indexed in transverse directions so as to superimpose selected portions thereof with respect to the microimaged dry-process mask film strip as it is advanced or moved to the image transferring station, so as to transfer microimages, initially and/or subsequently as "add-ons" as desired, to the microfiche or microform card. Provisions are made for accurately determining and positioning the mircofiche or microform card for this purpose.

In the method and apparatus of this invention, the dry-process mask film strip is imaged and developed to provide frames of microimaged transparencies in the imaging and developing station, which frames of microimaged transparencies are advanced or moved to the image transferring station for transferring the microimages to the dry-process microfiche or microform card. In accordance with this invention, provision is made to retract or move the dry-process mask film strip, each time after it has advanced or moved a microimaged transparency frame to the image transferring station for image transferring purposes, to retract or move that microimaged transparency frame to a point closely spaced from the imaging point in the imaging and developing station for the next cycle of operation. As a result, the microimaged transparency frames are formed adjacent to each other in the dry-process mask film strip, without any substantial gap therebetween, so as to utilize a minimum amount of the dry-process mask film strip in the practice of this invention. Suitable control means for advancing and retracting, i.e. moving the dry-process mask film strip for this purpose are provided in the apparatus of the invention. Where the microimage in the process mask film strip is developed at a point in time following the imaging thereof, the control means for advancing and retracting or moving the dry-process mask film strip includes means for advancing or moving and microimaged frame from the imaging point to the developing point in the imaging and developing station for developing the microimaged frame into the microimaged transparency before the latter is advanced or moved to the image transferring station.

The imaging point in the imaging and developing station utilizes a camera for reducing the reflected light image from the hard copy and applying the same to the dry-process mask film strip to provide a microimage therein. The developing point in the imaging and developing station preferably utilizes a heated plunger for uniformly heating the microimage in the dry-process mask film strip for producing the microimaged transparency. The image transferring station, in addition to utilizing a flash lamp for providing short pulses of energy above a threshold value for transferring the microimages from the dry-process mask film strip to the dry-process microform film, also includes means, such as a plunger, for applying positive contact pressure between the dry-process mask film strip and the microform film while the microimage is being transferred. The details of the apparatus, including the foregoing, are set forth more specifically below. Likewise, the construction, nature and characteristics of the dry-process mask film strip and the dry-process microform film are, also, more specifically set forth below.

Further objects of this invention reside in the method and in the cooperative relationships between the steps of the method, and reside in the constructions of the apparatus and in the cooperative relationships between the component parts of the apparatus.

Other objects and advantages of this invention will become apparent to those skilled in the art upon reference to the accompanying specification, claims and drawings in which:

FIG. 3 is a timing diagram illustrating the timing control of the apparatus illustrated in FIGS. 1 and 2.

FIG. 4 is a perspective view of a desk or table-top apparatus embodying the features illustrated in FIGS. 1 and 2.

FIG. 5 is an enlarged sectional view of the developing point of the imaging and developing station illustrated in FIG. 1.

FIG. 6 is an enlarged sectional view of a portion of the image transferring station illustrated in FIG. 1.

FIG. 7 is a diagrammatic representation of the hard copy which is to be microimaged by the preferred form of this invention.

FIG. 8 is a diagrammatic representation of the dry-process mask film strip which has been imaged and developed.

FIG. 9 is a diagrammatic representation of the dry-process microform film to which the image has been transferred.

FIG. 10 is an enlarged diagrammatic view of the preferred dry-process mask film strip before it has been imaged.

FIG. 11 is a diagrammatic view of the dry-process mask film strip after it has been initially imaged.

FIG. 12 is a diagrammatic view of the initially imaged dry-process mask film strip after it has been developed.

FIG. 13 is a diagrammatic view of a preferred form of the microform film.

FIG. 14 is a diagrammatic view of the microform film of FIG. 13 superimposed over the imaged and developed mask film strip of FIG. 12.

FIG. 15 is a diagrammatic view similar to FIG. 14 but illustrating the image being transferred from the mask film strip to the microform film.

FIG. 16 is a diagrammatic view of the microform film with the image transferred thereto.

FIG. 17 is a diagrammatic representation of the hard copy which is to be microimaged by an alternative form of this invention.

FIG. 18 is a diagrammatic representation of an alternative dry-process masking film strip which has been imaged and developed.

FIG. 19 is a diagrammatic representation of the dry-process microform film to which the image has been transferred.

FIG. 20 is a diagrammatic view of the alternative dry-process mask film strip before it has been imaged.

FIG. 21 is a diagrammatic view of the dry-process mask film strip of FIG. 20 after it has been imaged and heat developed.

FIG. 22 is a diagrammatic view of a preferred form of the microform film.

FIG. 23 is a diagrammatic view of the microform film of FIG. 22 superimposed over the imaged and developed mask film strip of FIG. 21.

FIG. 24 is a diagrammatic view similar to FIG. 23 but illustrating the image being transferred from the mask film strip to the microform film.

FIG. 25 is a diagrammatic view of the microform film with the image transferred thereto.

Figure 1:
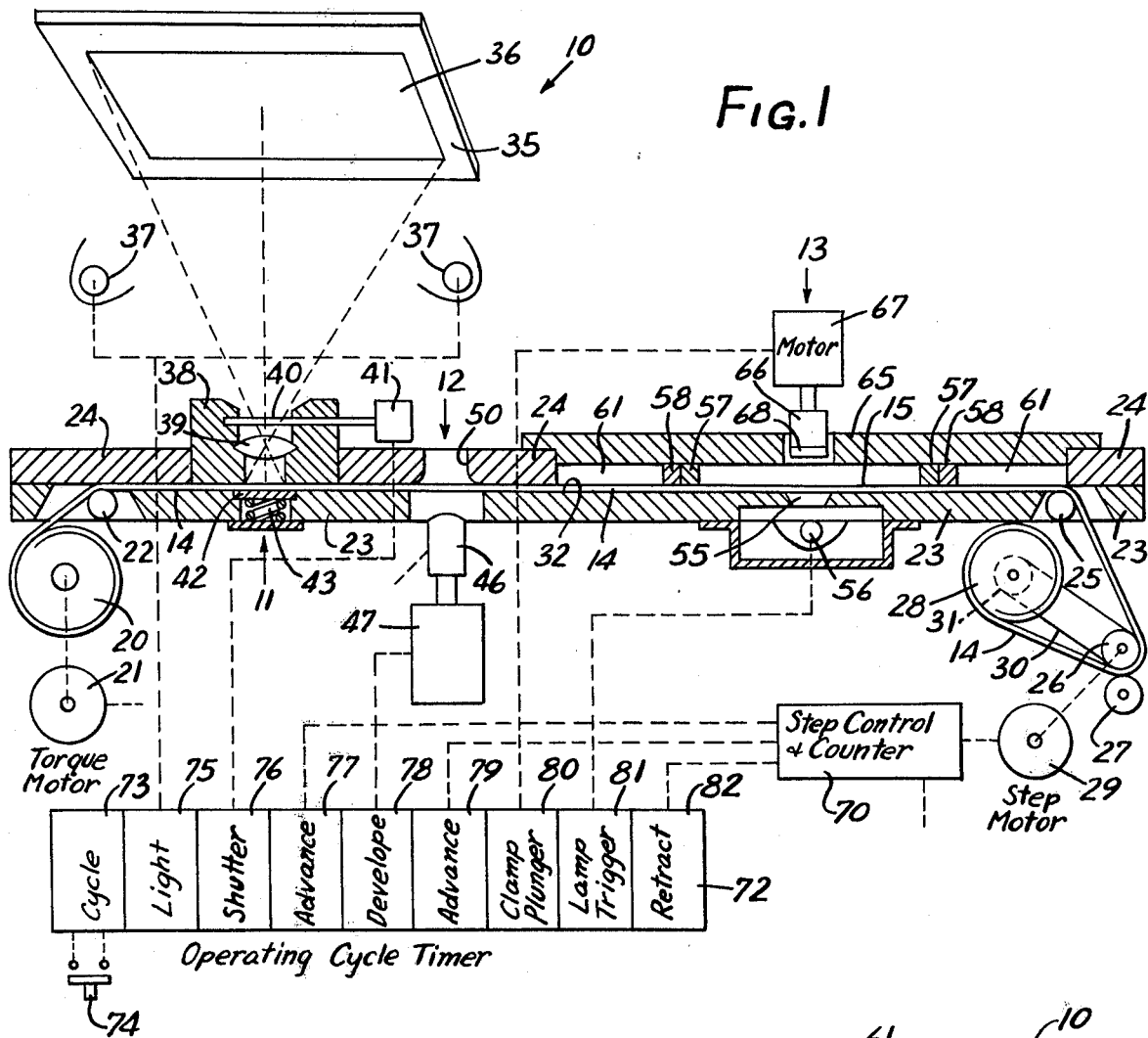
FIG. 1 is a diagrammatic illustration partly in section showing the preferred form of the apparatus and of the method.
Figure 2:
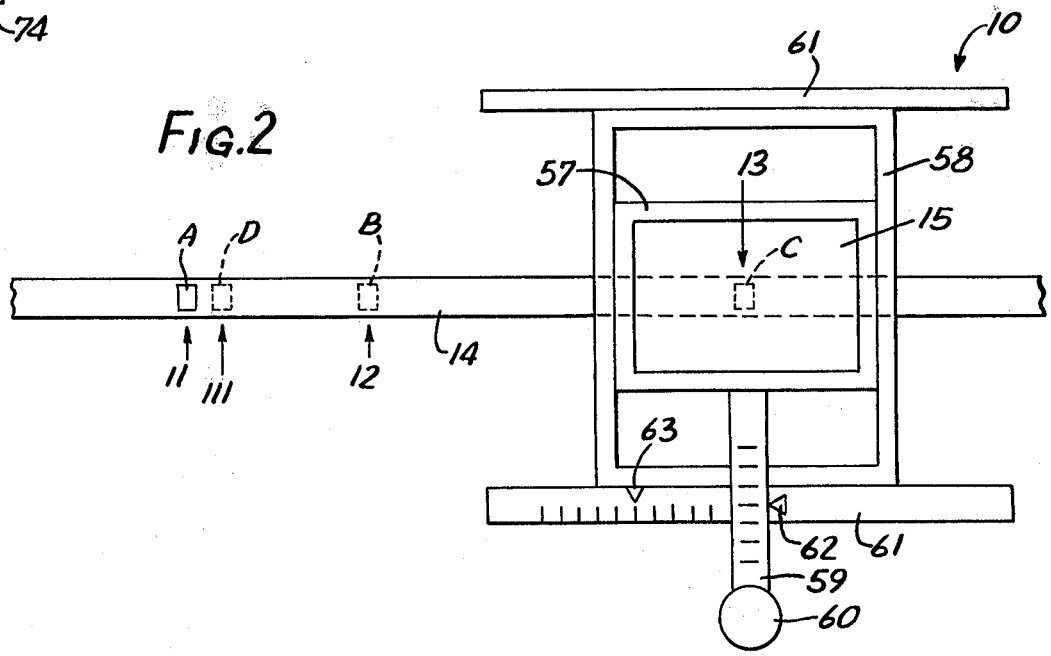
FIG. 2 is a top plan view of a portion of the apparatus illustrated in FIG. 1.

One form of the dry-process apparatus of the invention is generally designated at 10 in FIGS. 1, 2 and 4 of the drawings. It includes an imaging and developing station generally designated at 11, 12 and an image transferring station generally designated at 13. It utilizes a dry-process mask film strip 14 which is advanced or moved to the imaging and developing station 11, 12 and the image transferring station 13 and, also, a dry-process microform film 15 which is superimposed with respect to the dry-process mask film strip 14 in the image transferring station 13. The dry-process microform film 15 is preferably in, and illustrated as being in, the form of a microfiche or microform card.

The imaging and developing station 11, 12 preferably includes an imaging point 11 at which a frame of the dry-process mask film strip is microimaged and a developing point 12 where the microimaged frame is heat developed to produce a microimaged transparency frame. For purposes of illustration herein, the developing point 12 is spaced 10 microimage frames from the imaging point 11. Likewise, for purposes of illustration herein, the image transferring station 13 is spaced 20 microimage frames from the developing point 12 and, hence, 30 microimage frames from the imaging point 11 of the imaging and developing station 11, 12.

After the dry-process mask film strip 14 is microimaged to provide a microimaged frame A (as indicated in solid lines in FIG. 2) at imaging point 11, the mask film strip 14 is advanced or moved a distance of 10 microimage frames to advance or move the microimaged frame to the heat developing point 12 (as indicated at B in broken lines in FIG. 2) where the microimaged frame is heat developed. After the microimaged frame is so heat developed, the mask film strip 14 is advanced or moved a further distance of 20 microimage frames to advance or move the microimaged and developed frame to the image transferring station 13 (as indicated at C in broken lines in FIG. 2) where the microimage in the mask film strip 14 is transferred to the microform film 15. After the microimage is so transferred, the mask film strip 14 is retracted or moved a distance of 29 frames to retract the microimaged frame to a point 111 which is closely spaced from, for example, one microimage frame short of the imaging point 11 in the imaging and developing station 11, 12 (as indicated at D in broken lines in FIG. 2). As a result of this cycle of operation, an unimaged portion or frame of the dry-process mask film strip 14, next to the microimaged frame D, is presented to the imaging point 11 for a repeat of the foregoing cycle. In this way, substantially none of the dry-process mask film strip 14 is wasted.

The dry-process mask film strip 14 is supplied from a supply roll 20 which is suitably connected to a torque motor 21 which has the function of winding the mask film strip 14 on the roll 20 when permitted to do so but which allows the mask film strip 14 to be withdrawn from the roll 20 against the torque of the motor 21. In other words, the torque motor 21 operates as a spring on the supply roll 20 to maintain tension on the mask film strip 14, to wind the mask film strip 14 on the supply roll 20 when permitted to do so and to allow the mask film strip to be supplied from the supply roll 20 under tension when this is desired. The mask film strip 14 is fed by a roll 22 between a pair of plate members 23 and 24 which are preferably separably arranged. One of the plate members, preferably the plate member 23, is provided with a groove 32 for guiding the mask film strip 14 between the plate members 23 and 24. The other end of the mask film strip 14 is fed by a roll 25 between a pair of spring biased pinch rolls 26 and 27 which preferably have rubber surfaces to provide a film non-slip grip upon the mask film strip 14. The pinch roll 26 is driven by a step motor 29 and the pinch roll 26 also drives a rewind roll 28 through a slip type resilient belt 30 coursing a pulley 31 on the rewind roll. The mask film strip 14 is fed from the pinch rolls 26 and 27 onto the rewind roll 28. The drive 30, 31 for the rewind roll 28 operates to maintain tension in the mask film strip 14 between the pinch rolls 26 and 27 and the rewind roll 28. As the step motor 29 is operated in steps in one direction, the pinch rolls 26 and 27 operate to advance or move the mask film strip 14 from left to right as illustrated in FIG. 1 against the torque of the torque motor 21. When the step motor 29 is stationary, the pinch rolls 26 and 27 are stationary to hold the mask film strip 14 stationary against the action of the torque motor 21. When the step motor 29 is rotated in steps in the opposite direction the pinch rolls 26 and 27 operate to retract or move the mask film strip 14 from right to left as illustrated in FIG. 1, such right to left retraction being afforded by the torque motor 21.

The imaging point 11 of the imaging and developing station includes a support 35, such as a glass panel, for supporting hard copy 36, such as documents or the like, which are to be microimaged. The hard copy is illuminated by lamps 37 which may be incandescent, tungsten, quartz or iodine lamps. These lamps 37 preferably have a total energy of about 1 kilowatt and provide a broad band white light source for illuminating hard copy 36.

The imaging point 11 also includes a camera 38 having a lens 39, and, preferably, a shutter 40, suitably operated by a mechanism 41, for reducing or condensing the reflected light image from the hard copy 36 and applying the same to the mask film strip 14 in microimage size. The reduction ratio to microimage size is preferably about 24X. The imaging by a spring 43 also preferably includes a pressure plate or means 42 backed by a spring 43 for holding the mask film strip 14 in flat condition and in proper focal position with respect to the lens 39. When the hard copy 36 is illuminated by the lamps 37 and the shutter 40 operated by the mechanism 41 to microimage the mask film strip 14, the microimage so produced is a latent image which has to be heat developed.

The heat development of the latent microimage is accomplished in the developing point 12 of the imaging and developing station. The developing point 12 includes a heated plunger 46 which is in a normally retracted position as illustrated in FIG. 1 so as to normally maintain the heat source from the plunger 46 away from the mask film strip 14. The plunger 46 is advanced into engagement with the mask film strip 14 by a suitable motor or solenoid 47. The advanced position of the plunger 46 is illustrated in more detail in FIG. 5. The plunger 46 is preferably made of aluminum or the like and is provided with a thermostatically controlled heater 48 for heating the same. As shown, the plunger is coated with a suitable low heat conductivity substance, such as Neoprene, so as to provide a uniform heating surface. The temperature of the heating surface is preferably maintained at about 124°C. As is seen in FIG. 5, the heating surface of the plunger 46 is cylindrical transversely of the mask film strip 14 and operates to move the mask film strip 14 upwardly into a cavity 50. This movement of the mask film strip 14, which is under tension, keeps the mask film strip from curling and provides a uniform heating contact between the mask film strip 14 and the plunger 46 for accurately developing the latent image in the mask film strip 14 into a microimaged transparency. After the heat development of the microimage is completed the plunger 46 is retracted and made ready for the heat development of another latent microimage in the mask film strip 14.

In the image transferring station 13 the microform film 15 is interposed over the mask film strip 14 above a glass window 55 in the plate member 23 which has a configuration corresponding to a microimaged frame in the mask film strip 14. A short pulse of energy is passed through the glass window 55 and the microimaged and developed frame of the mask film strip 14 onto the microform film 15 for transferring the microimage from the mask film strip 14 to the microform film 15. The energy source 56 is preferably a Xenon flash tube such as Model No. FX-33C-15 of E G & G Company, The Xenon flash tube has an electrical input of a maximum of about 50 Joule. It is a broad band type of the tube having a range from UV to infrared with wavelengths of about 2,000A to 10,000A. Instead of utilizing a Xenon flash tube as the source of short pulses of energy above a threshold value, a broad dot laser or a scanning laser could be utilized.

As expressed above, the microform film is preferably in the form of a microfiche or microform card, the microfiche having the normal 4×6 inch dimension and capable of receiving up to 96 microimages at a 24X reduction ratio of the apparatus. In order to position the microfiche 15 in transverse directions it is placed in an open frame 57 which is adapted to move transversely of the mask film strip 14 in an open frame 58. The open frame 58 is adapted to move longitudinally with respect to the mask film strip 14 in suitable guides 61. The frames 57 and 58 may be moved in their respective directions by a suitable extension 59 on the frame 57 provided with a handle 60. Thus, by manipulating the handle 60 any point on the microfiche 15 may be positioned over the mask film strip 14 at the glass window 55. Suitable indicia on the extension 59 and on the guide 61 may cooperate with indicators 62 and 63 on the guide 61 and the frame 58 for indicating the positions of the microfiche 15 with respect to the glass window 55. As a result, microimages may be transferred from the mask strip 14 to any desired position on the microfiche 15.

The plate member 24 may be provided with a cover 65 overlying the open frames 57 and 58 and this cover is provided with an opening in alignment with the glass window 55 for receiving a plunger 66. The plunger 66 is normally in a retracted position as illustrated in FIG. 1 but it may be advanced to advance position as illustrated in FIG. 6 by a motor or solenoid 67. The plunger 66 is provided with a rectangular rubber pad 68 of substantially the same configuration as the window 55. When the motor or solenoid 67 is energized to advance the plunger 66, the rubber pad 68 clamps the microfiche 15 and the mask film strip 14 between it and the glass window 55 so as to provide good and firm contact between the microfiche 15 and the mask film strip 14 while the pulses of energy above a threshold value are being transmitted through the microimaged transparency of the mask film strip 14 onto the microfiche 15 for transferring the image from the former to the latter.

The step motor 29 for operating the pinch rolls 26 and 27 in one direction or the other is of conventional construction and is operated in step fashion in one direction or the other by intermittent signals applied thereto of one direction or the opposite direction. When intermittent signals are not applied thereto, the step motor 29 is locked or maintained in its then position. The step motor 29 is controlled by a step control and counter 70. When the step control and counter 70 is energized with a signal of one polarity or of opposite polarity, it applies intermittent signals of one direction or of opposite direction to the step motor 29 and counts such signals so applied. A computer logic or memory system in the step control and counter 70 stops the application of the intermittent signals when a selected predetermined number of intermittent signals have been applied to the step motor 29. For purposes of illustration herein it is assumed that 16 intermittent signals are required to advance the mask film strip 14 one microimage frame. Thus, when a microimage frame on the mask film strip 14 is to be advanced or moved the distance of 10 frames from the imaging point 11 to the developing point 12 in the imaging and developing station, the step controller and counter 70, responding to a signal of one polarity, applies 160 pulses of one direction to the step motor 29. Likewise, when a microimage frame on the mask film is to be advanced or moved 20 frames from the developing point 12 in the imaging and developing station to the image transferring station 13, the step controller and counter 70 responding to a signal of the same direction, applies 320 pulses of the same direction to the step motor 29. Conversely, when a microimage frame on the mask film strip is to be retracted or moved 29 frames from the image transferring station 13 to a point 111, closely spaced from, for example, one frame short of, the imaging point 11 in the imaging and developing station, the step controller and counter, in response to a signal of opposite polarity, applies 464 pulses of the opposite direction to the step motor 29.

The lamps 37 and the shutter 40 in the imaging point 11 and the heating plunger 46 in the developing point 12 of the imaging and developing station, the energy source 56 and the plunger 66 of the image transferring station 13, and the step control counter 70 and the step motor 29 for advancing and retracting or moving the mask film strip 14 are sequentially operated and controlled in timed relation during an operating cycle by an operating cycle timer 72 as illustrated in FIG. 1 in accordance with the timing chart as illustrated in FIG. 3. The operating cycle timer 72 includes a cycle control which is initiated by a start switch 74 which, when momentarily closed, runs the operating cycle timer 72 through a complete cycle of operation. A light control section 75 of the timer 72 turns on the lamps 37 for illuminating the hard copy 36 for a period of about 1 ½ seconds and during this interval a shutter control section 76 opens and closes the shutter 40 by means of the shutter activating mechanism 41 for the purpose of applying the reflected image from the hard copy 36 to the mask film strip 14 for the purpose of producing a latent microimage thereon. During the next half-second a mask film strip advance or moving section 77 of the timer applies a signal of one polarity to the step control and counter 70 for advancing or moving the mask film strip 14 a distance of 10 frames. During about the next 5 seconds of the timing sequence a develop control section 78 of the timer operates the motor 47 to contact the heating plunger 46 with the mask film strip 14 in the developing point 12 of the imaging and developing station to heat develop the latent microimage advanced or moved thereto to provide a developed microimage transparency in the mask film strip 14. During approximately the next second a mask film strip advance or moving section 79 applies a signal of the same polarity to the step control and counter 70 for advancing or moving the mask film strip 14 a distance of 20 frames to advance or move the microimage transparency from the developing point 12 to the image transferring station 13. Thereafter, during approximately the next 1 ½ seconds a clamp plunger control section 80 operates the motor 67 to advance the clamping plunger 66 in the image transferring station. During this latter interval a lamp trigger control section 81 in the timer triggers the energy source 56 for transferring the microimage from the mask film strip 14 to the microfiche or microform card 15. During approximately the next half-second a mask film strip retract or moving control section 82 of the timer applies a signal of opposite polarity to the step control and counter 70 for operating the step motor 29 in the opposite direction to retract or move the mask film strip 14 a distance of 29 frames so that the initially imaged frame of the mask film strip 14 is retracted to the point 111, closely spaced from, for example, one frame short of, the imaging point 11 of the imaging and developing station. After this cycle of operation is completed a new hard copy 36 is presented for the purpose of producing another microimage thereof. This new microimage may be produced through the aforementioned operating cycle by momentarily depressing the start button 74.

In FIG. 7, the hard copy 36, such as documents or the like, are represented as having a white reflecting background 85 and black non-light reflecting data or information 86.

The dry-process mask film strip 14, as illustrated in FIG. 10, is generally known in the trade as a dry silver film developed by 3M Company, and it may be like those disclosed in U.S. Pat. No. 3,152,903 of Joseph W. Shepard and Benjamin L. Shely and U.S. Pat. No. 3,152,904 of David P. Sorensen and Joseph W. Shepard, both of which are assigned to 3M Company (formerly Minnesota Mining and Manufacturing Company). More specifically, the mask film strip 14 may be the 3M Company Type 784-SP dry silver film or Type 7869 dry silver film, the latter being preferred. The former is orthochromatic with a film response to wavelengths from U.V. to green (4,000–5,000A). The latter is panchromatic with a film response to wavelengths from U.V. to far red (4,000 to 7,500A).

Such a dry silver film strip, as illustrated in FIG. 10, includes a flexible and substantially transparent synthetic plastic substrate 87, such as Mylar (polyethylene glycol terephthalate), or its equivalent, such as polycarbonate or the like. Coated on the substrate 87 is a layer 88 which is also substantially transparent and which is photosensitive to and imaged by light and dry developed by heat to provide imaged transparencies therein. The mask film strip 14 has a thickness of about 4 mils. The layer 88 includes an admixture of an oxidizing agent, a reducing agent and a catalyst former compound which forms free silver metal nuclei on exposure to light, all dispersed in a resin binder. More specifically, as an example, the admixture comprises silver behenate as the oxidizing agent, hydroquinone as the reducing agent, silver chloride as the catalyst former, and a copolymer of butadiene and styrene as the resin binder. Only the silver chloride is photosensitive.

As illustrated in FIG. 11, when a light image or pattern of light 90 is applied to the mask film strip 14, as at the imaging point 11 of the apparatus of FIG. 1, photolytic silver is formed in the silver chloride only where the light 90 is applied to the mask film strip to produce latent images 91 therein. The interval (exposure time) during which the light is applied to the mask film strip is about 1 ½ seconds which is appropriate under the light conditions in accordance with this invention.

As illustrated in FIG. 12, when heat 92 is applied to the mask film strip 14, as at the developing point 12 of the apparatus of FIG. 1, the photolytic silver in the latent images catalyses a reaction between the silver behenate oxidizing agent and the hydroquinone reducing agent and the silver behenate is reduced to form silver crystal images 93 in the areas of the initial latent images 91. The interval (development time) during which heat is applied to the mask film strip is about 5 seconds which is appropriate under the heat energy conditions of approximately 124°C in accordance with this invention. The combination of the approximately 1 ½ second exposure time and the approximately 5 second development time provides an optical density of approximately 0.7 at the imaged and developed areas 93 and of approximately 0.15 at the unexposed areas 88. This is of importance when the developed image is transferred from the mask film strip 14 to the microform film 15 in the image transferring station 13 of the apparatus of FIG. 1. In the normal development of dry silver films, they are usually heated from 10 to 30 seconds to provide a greater developed image optical density of about 2.75. The working resolution of the imaged and heat developed mask film strip is approximately 380 lines per millimeter but the developed images 93 are quite grainy and, also, the edge boundaries between the imaged areas 93 and the unimaged areas 88 are quite irregular due to the crystalline silver forming the imaged areas.

The imaged and developed dry-process mask film strip 14 is represented in FIG. 8 as having substantially transparent areas 88 corresponding to the black areas 86 of the hard copy 36 and substantially opaque areas 93 corresponding to the white areas 85 of the hard copy. Thus, the mask film strip 14 is negative working and the imaged transparency thereof is a negative of the hard copy 36.

The dry-process microform film 15, which as stated above is preferably in the form of a microfiche or microform card, is illustrated in FIG. 13. It is a microform film which essentially is not photosensitive to light it having archival properties, but which is sensitive to and imaged and developed by short pulses of electromagnetic energy above a threshold value applied thereto in accordance with a process referred to herein as a dispersion process. Such dry-process microform films may be like those disclosed in U.S. patent application Ser.

No. 162,842, filed July 15, 1971 by Robert W. Hallman, Stanford R. Ovshinsky and John P. deNeufville, and in their continuation-in-part U.S. patent application Ser. No. 407,944, filed by them on Oct. 19, 1973.

Briefly, as disclosed in said patent applications, the microform film basically includes a flexible, and preferably a substantially transparent synthetic plastic, substrate upon which is deposited a thin continuous and substantially opaque and energy absorbing dispersion imaging film of relatively high surface tension in the molten or softened condition.

Exemplary of dispersion type imaging materials which satisfy the aforementioned desiderata are the chalcogenide elements, excepting oxygen, and the glassy or crystalline compositions containing them. Among the better dispersion imaging materials are tellurium and various compositions containing tellurium and other chalcogenides such as compositions of (parts being by weight in each instance): 92.5 atomic parts tellurium, 2.5 atomic parts germanium, 2.5 atomic parts silicon and 2.5 atomic parts arsenic; a composition of 95 atomic parts tellurium and 5 atomic parts silicon; a composition of 90 atomic parts tellurium, 5 atomic parts germanium, 3 atomic parts silicon and 2 atomic parts antimony; a composition of 85 atomic parts tellurium, 10 atomic parts germanium and 5 atomic parts bismuth; a composition of 85 atomic parts tellurium, 10 atomic parts germaniun, 2.5 atomic parts indium and 2.5 atomic parts gallium; a composition of 85 atomic parts tellurium, 10 atomic parts silicon, 4 atomic parts bismuth and 1 atomic part thallium; a composition of 80 atomic parts telluirum, 14 atomic parts germanium, 2 atomic parts bismuth, 2 atomic parts indium and 2 atomic parts sulfur; a composition of 70 parts tellurium, 10 atomic parts arsenic, 10 atomic parts germanium and 10 atomic parts antimony; a composition of 60 atomic parts tellurium, 20 atomic parts germanium, 10 atomic parts selenium and 10 atomic parts sulfur; a composition of 60 atomic parts tellurium, 20 atomic parts germanium and 20 atomic parts selenium; a composition of 60 atomic parts tellurium, 20 atomic parts arsenic, 10 atomic parts germanium and 10 atomic parts gallium; a composition of 81 atomic parts tellurium, 15 atomic parts germanium, 2 atomic parts sulfur and 2 atomic parts indium; a composition of 90 atomic parts selenium, 8 atomic parts germanium and 2 atomic parts thallium; a composition of 85 atomic parts selenium, 10 atomic parts germanium and 5 atomic parts copper; a composition of 85 atomic parts selenium, 14 atomic parts tellurium and 1 atomic part bromine; a composition of 70 atomic parts selenium, 20 atomic parts germanium and 10 atomic parts bismuth; a composition of 95 atomic parts selenium and 5 atomic parts sulfur; and variations of such compositions. In addition, the dispersion imaging materials can comprise metals or elements, such as bismuth, antimony, selenium, cadmium, zinc, tin, polonium, indium, and compounds of such metals or elements, specific examples of which are antimony trisulfide, bismuth trisulfide, and the like. Bismuth forms particularly suitable and preferred dispersion imaging materials.

A preferred form of the microform film or microfiche or microform card 15 is illustrated in FIG. 13. It includes a flexible and substantially transparent synthetic plastic substrate 95, such as Mylar (polyethylene glycol terephthalate) or its equivalent, such as polyethylene, polyacetate, cellulose acetate, polypropylene, polycarbonate or the like. The substrate 95 may have a thickness within the range of 7 to 15 mils, a thickness of about 10 mils being preferred. Coated on the substrate 95, preferably by evaporation (vacuum deposition) or the like, is a thin continuous solid dispersion film 96 of bismuth having a thickness within the range of about 1,000 to 2,000A. This thin continuous dispersion film or layer 96 of bismuth is heat absorbing and has a melting point of 271.3°C. A protective overcoat 97 is suitably applied over the bismuth layer 96 and it comprises a substantially transparent synthetic plastic film of Saran polyvinylidene or equivalent material, such as polyvinyl alcohol, polyvinyl formal, or the like. The protective overcoat film 97 has a thickness of about 1 micron.

The microform film 15 is shown in FIG. 14 to be superimposed over the imaged and developed mask film strip 14, as it is in the image transferring station 13 of the apparatus illustrated in FIG. 1, with the respective substantially transparent substrates 95 and 87 thereof on the outside. When a short pulse of electromagnetic energy above a threshold value 98 is applied, as illustrated in FIG. 15, as is done in the image transferring station 13 of the apparatus illustrated in FIG. 1, such energy pulse 98 is absorbed and scattered by the imaged and heat developed metallic silver areas 93 of the mask film strip 1 so as not effectively to reach the microform film 15 at those areas and not to affect the continuous opaque dispersion film layer 96 thereof at those areas.

However, such short energy pulse 98 readily passes through the substantially transparent areas 88 of the mask film strip 14 and the protective overcoat film 97 of the microform film 15 to the dispersion film layer 96 at the areas 99 thereof where the energy pulse is absorbed. This absorption of the electromagnetic energy pulse 98 being so absorbed heats the dispersion film layer 96 at these areas 99 to at least a softened or molten condition, whereupon the continuous solid dispersion film layer 96 at these areas 99 is broken up and dispersed into small and widely spaced globules to make these areas substantially transparent. This dispersion of the material of the dispersion film layer 96 at the heated soft molten areas 99 is occasioned principally by the surface tension of the heated material which causes the heated material to form such small and widely spaced globules. After the globules are so formed by the short pulse of the electromagnetic energy, they quickly cool and remain in that globular condition to provide the substantially transparent condition of the areas 99.

The spaced apart globules have a thickness dimension which is greater than the thickness dimension of the thin continuous solid dispersion film layer 96 due to the fact that the volume of the material in the areas 99 necessarily remains the same. However, this change in thickness dimension is readily accommodated by the resiliency and nature of the flexible substrate 95 and the flexible protective coating film 97 of the microform film 15.

The ultimate microimaged microform film or microfiche or microform card 15, which is capable for use for retrieving data or information microimaged therein, is illustrated in FIG. 16 and includes the substantially transparent substrate 95, the substantially transparent protective coating film 97, the continuous solid substantially opaque areas 96, and the substantially transparent areas 99. The microform film 15, which is initially substantially opaque and which is rendered substantially transparent where the electromagnetic energy is applied thereto, is positive working and it is so represented in FIG. 9 as having substantially opaque areas 96 corresponding to the substantially opaque areas 93 of the mask film strip 14 and substantially transparent areas 99 corresponding to the substantially transparent areas 88 of the mask film strip 14. Thus, the microform film 15 is a positive of the mask film strip 14 and a negative of the hard copy 36. The microimages produced in the microform film 15 are microimage transparencies which are readable in the transmission mode.

The short pulses of electromagnetic energy produced by the energy source 56 (Xenon flash tube) are within the range of 10 milliseconds down to 1 microsecond or less, for example, down to 0.1 microseconds. For a short pulse of 10 microseconds the applied energy from the source for causing dispersion in the areas 99 of the microform film 15 (without the intervening mask film strip 14) is about 300 milli Joules per sq. cm. With the intervening mask film strip 14, the applied energy is about 950 milli Joules per sq. cm. These short pulses of electromagnetic energy of the values indicated constitute short pulses above a threshold value to provide the imaged records in the microform film 15. The optical densities of the microform film 15 are in the range of 2.2 to 2.5 for the non-imaged substantially opaque areas 96 and in the range of 0.2 to 0.3 for the substantially transparent imaged areas 99, which provides high contrast characteristics. This high contrast in the microform film 15 is produced from and compared to the optical densities of the mask film strip 14 which are about 0.7 for the imaged substantially opaque areas 93 and about 0.15 with a maximum of about 0.20 for the non-imaged substantially transparent areas 88 which are low contrast characteristics.

The combination of the short exposure of about 1.5 seconds of the mask film strip 14 at the imaging point 11 of the apparatus of FIG. 1 instead of a normally prescribed longer exposure up to about 5 seconds, and the short heat development thereof of about 5 seconds at the developing point 12 of the apparatus of FIG. 1 instead of the normally prescribed longer heat development of between 10 to seconds, provides the aforementioned optical density of about 0.7 for the imaged substantially opaque areas 93 of the mask film strip 14, instead of the normally expected higher and possible optical densities up to 2.75 where the normally prescribed longer exposure and heat development times are used. This relatively low optical density of about 0.7 prevents substantial absorption of the short pulses of electromagnetic energy 98 at the imaged and substantially opaque areas 93 of the mask film strip 14 which would be detrimental to and destructive of the mask film strip. Destruction of the mask film strip 14 by excess absorption of the electromagnetic energy pulses would be so fast as to prevent imaging of the microform film. The electromagnetic energy pulses 93 are principally absorbed and scattered by the imaged and substantially opaque areas 93 of the mask film strip 14 and the amount of such energy which is not scattered or absorbed and passed through the imaged and substantially opaque areas 93 is below the threshold value required for the image dispersion of the dispersion imaging layer 96 of the microform film 15 and causes no imaging at these areas in the microform film 15 corresponding to the areas 93 in the mask film strip 14.

Since the substantially opaque dispersion imaging layer 96 of the microform film 15 is a continuous solid layer, it is not grainy as is the imaged and developed areas 93 of the mask film strip 14 which include silver crystals which are necessarily grainy. As a result, the boundaries between the substantially opaque areas 99 and the substantially transparent areas 97 of the microform film 15 have a greater sharp edge definition than the boundaries between the grainy substantially opaque areas 93 and the substantially transparent areas 88 of the mask film strip 14. It has been found that the sharp edge definition in the microform film 15 is obtained from the mask film strip 14 even though the edge definition thereof is considerably less sharp. This is due to the high gamma (gamma larger than 10) of the dispersion material. Because of the sharp edge definition, the microform film 15 has a resolution of 600 lines per millimeter as compared to a resolution of substantially 380 lines per millimeter for the mask film strip 14. As a result, the definition of the microform film 15 substantially as great as that of the mask film strip 14.

In the foregoing description, the flexible substrate 95 of the microform film 15 has been described as a substantially transparent synthetic plastic substrate so that the microimages formed therein are microimage transparencies which can be optically retrieved in the transmission mode. However, the flexible substrate 95 may be formed of a light reflective material, such as white paper, so that light may be reflected therefrom through the substantially transparent areas 99 to retrieve optically in the reflection mode of the microimaged data or information formed in the microform film 15.

An alternative form of the mask film strip 14 is designated at 14A in FIGS. 20, 21, 23 and 24 of the drawings. It is initially a substantially opaque mask film strip and is positive working as compared to the preferred negative working initially substantially transparent mask film strip 14 discussed above. As illustrated in FIG. 20, it includes a flexible synthetic plastic substantially transparent substrate like the substrate 87 of the mask film strip 14. Deposited on the substrate 101 is a thin continuous solid layer 102 of metallic silver which is substantially opaque and reflective, and deposited thereover is a thin layer 103 of arsenic trisulfide ($As_2S_3$) which is substantially transparent.

When an image or pattern of reflected light 90, as illustrated in FIG. 21, is applied to and through the substantially transparent $As_2S_3$ side of the mask film strip 14A, as is done at the imaging point 11 of the apparatus of FIG. 1, and heat 92 is also simultaneously applied to the mask film strip 14A, the reflected light image or pattern 90 causes a reaction beginning at the interface of the $As_2S_3$ layer 103 and the metallic silver provides a substantially transparent reaction product at the light imaged areas 104. To apply simultaneously the heat to the mask film strip 14A as it is being imaged and developed at the imaging point 11 of the apparatus of FIG. 1, the pressure plate 42 at the imaging point 11 may be suitably heated for this purpose, and the subsequent heat developing point 12 of the apparatus of FIG. 1 may be taken out of operation or dispensed with. In this event, the step motor 29 may be controlled by the step control and counter 70 and the operating cycle timer 72, to or move the mask film strip 14A (30 frames) to or move the microimaged and developed frame from point A at the imaging point 11 directly to point C of the image transferring station 13, and after image transfer to retract or move the mask film strip 14A (29 frames) to retract or move the microimaged frame from point C at station 13 to point 111, closely spaced from point 11 as indicated at D, just as in FIGS. 1 and 2.

The thus microimaged and developed mask film strip 14A is initially substantially opaque and has substantially opaque areas 102 and substantially transparent areas 104 where exposed and developed as illustrated in FIGS. 21 and 18. The mask film strip 14A is therefore positive working and provides a positive microimaged transparency of the hard copy 36, as is seen from FIGS. 17 and 18.

The microform film 15 is the same as discussed above and is illustrated in FIGS. 22 to 25 to include a flexible substantially transparent synthetic plastic substrate 95, a substantially opaque dispersion imaging layer 96 and a substantially transparent protective layer 97. As shown in FIG. 23, this microform film is superimposed over the imaged and developed mask film strip 14A, as it is in the image transferring station 13 of the apparatus illustrated in FIG. 1, with the substantially transparent substrates on the outside. When a short pulse of electromagnetic energy above a threshold value 98 is applied, as is illustrated in FIG. 24, as is done in the image transferring station 13 of the apparatus of FIG. 1, such energy pulse 98 is reflected by the non-imaged solid and continuous and opaque metallic silver layer areas 102 so as not to reach the microform film 15 at those areas and not to effect the continuous opaque dispersion film layer 96 thereof at those areas. In addition, since the electromagnetic energy 98 is reflected by the non-imaged areas 102, it does not reach the interface between said such areas 102 and the $As_2S_3$ material 103 behind such areas, so that no reaction between the silver the the $As_2S_3$ is initiated by the electromagnetic energy 98. In this way, the integrity of the microimages in the mask film strip 14 is retained in the image transfer station 13 of the apparatus of FIG. 1.

However, such short energy pulse 98 readily passes through the substantially transparent areas 104 of the mask film strip 14A to the dispersion film layer 96 at the areas 99 of the microform film 15 where the energy pulse is to make such areas 99 substantially transparent in the manner discussed above. The imaged microform film 15 is illustrated in FIG. 25. The microform film 15, which is initially substantially opaque and which is rendered substantially transparent where the electromagnetic energy is applied thereof, is positive working and it is so represented in FIG. 19 as having substantially opaque areas 96 corresponding to the substantially opaque areas 102 of the mask film strip 14A and substantially transparent areas 99 corresponding to the substantially transparent areas 104 of the mask film strip 14A. Thus, the microform film 15 is a positive of the mask film strip 14A and a positive of the hard copy 36.

Since the microform film 15 is not photosensitive to light and is imaged only by a short pulse of electromagnetic energy of a threshold value by a dispersion process, it has excellent archival characteristics so as not be be deleteriously affected by light, temperature, moisture, degradation over a period of many years.

The dry-process method and apparatus of this invention is particularly adaptable for desk or table-top equipment for use in offices or the like. Such a piece of equipment is schematically illustrated in FIG. 4 and is shown to include a suitable housing 106 which contains the dry-process apparatus, like reference characters being utilized for like parts. In addition to the start switch 74, the equipment may also include additional control devices, for example, as illustrated at 107.

We claim:

1. A dry-process apparatus for producing archival microform records from light reflecting hard copy comprising in combination a dry-process mask film strip which is photosensitive to and imaged by light and dry developed by heat to provide imaged transparencies therein, an imaging and developing station, an image transferring station, means for moving the dry-process mask film strip to the imaging and developing station and to the image transferring station, means for applying light to the hard copy to be reflected thereby, means in the imaging and developing station for reducing the light image reflected from the hard copy to microimage size and applying the same to the dry-process mask film strip to produce microimages of the hard copy in the dry-process mask film strip when it is moved to the imaging and developing station, means in the imaging and developing station for heating the dry-process mask film strip when it is moved to the imaging and developing station for developing the microimages into microimage transparencies, a dry-process microform film which has archival properties and which is sensitive to and imaged and developed by short pulses of electromagnetic energy above a threshold value applied thereto to provide imaged records having archival properties, means in the image transferring station for receiving the dry-process microform film, means in the image transferring station for superimposing the dry-process microform film and the transparent microimaged dry-process mask film strip when it is moved to the image transferring station, and means in the image transferring station for applying short pulses of electromagnetic energy above a threshold value through the transparent microimaged dry-process mask film strip when it is moved to the image transferring station onto the dry-process microform film for providing in the dry-process microform film imaged microform records which conform to the transparent microimages in the dry-process mask film strip and which have archival properties.

2. A dry-process apparatus as defined in claim 1 wherein said imaged microform records provided in the dry-process microform film are transparent microimages.

3. A dry-process apparatus as defined in claim 1 wherein said dry-process microform film is in microfiche form, and said means in the image transferring station for receiving the dry-process microform film includes means for receiving the microfiche form and indexing the same in transverse directions so as to superimpose selected portions of the microfiche form with respect to the transparent microimaged dry-process mask film strip when it is moved to the image transferring station.

4. A dry-process apparatus as defined in claim 1 wherein said dry-process microform film comprises a light transparent substrate and a film deposited thereon which has archival properties and which is sensitive to and imaged and developed by short pulses of electromagnetic energy above a threshold value applied thereto for providing therein transparent microimages which are detectable in the light transmission mode through the microform film.

5. A dry-process apparatus as defined in claim 1 wherein said dry-process microform film comprises a light reflective substrate and a film deposited thereon which has archival properties and which is sensitive to and imaged and developed by short pulses of electromagnetic energy above a threshold value applied thereto for providing therein transparent microimages which are detectable in the light reflective mode by reflection of light from the light reflective substrate through the transparent microimages.

6. A dry-process apparatus as defined in claim 1 wherein said dry-process microform film comprises a substrate and a continuous substantially opaque film thereon which has archival properties and which is sensitive to and imaged and developed and made substantially transparent by dispersion of the continuous substantially opaque film where the short pulses of electromagnetic energy above the threshold value are applied thereto for providing the imaged microform records in the dry-process microform film.

7. A dry-process apparatus as defined in claim 1 wherein said dry-process mask film strip comprises a substantially transparent substrate and a substantially transparent film thereon which is photosensitive to and imaged by light and dry developed by heat to make the same substantially opaque where the light is applied thereto.

8. A dry-process apparatus as defined in claim 1 wherein said dry-process mask film strip comprises a substantially transparent substrate and a substantially opaque film thereon which is photosensitive to and imaged by light and dry developed by heat to make the same substantially transparent where the light is applied thereto.

9. A dry-process apparatus as defined in claim 1 wherein the means for moving the dry-process mask film strip to the imaging and developing station and to the image transferring station comprises, means for moving a microimage on said mask film strip from a point where it is imaged in the imaging and developing station to a point where said microimage is transferred to the dry-process microform film in the image transferring station, and means for moving said microimage on said mask film strip from said point in the image transferring station to a point closely spaced from the point where it was previously imaged in the imaging and developing station to present a closely adjacent unimaged portion of the mask film strip to the imaging point to be imaged thereat.

10. A dry-process apparatus as defined in claim 1 wherein said imaging and developing station includes an imaging point where the dry-process mask film is microimaged and a developing point spaced from the imaging point where the microimage is heat developed, wherein the means for moving the dry-process mask film strip to the imaging and developing station and to the image transferring station comprises, means for moving a microimage on said mask film strip from the imaging point first to the developing point and then to a point where said developed microimage is transferred to the dry-process microform film in the image transferring station, and means for moving said microimage on said mask film strip from said point in the image transferring station to a point closely spaced from the imaging point where it was previously imaged in the imaging and developing station to present a closely adjacent unimaged portion of the mask film strip to the imaging point to be imaged thereat.

11. A dry-process apparatus as defined in claim 1 wherein said imaging and developing station includes an imaging point where the dry-process mask film strip is microimaged and a developing point spaced from the imaging point where the microimage in the dry-process mask film is heat developed, and wherein said imaging point of said imaging and developing station includes a camera having a pressure means for maintaining the dry-process mask film strip in flat condition and in proper focal position when it is being imaged.

12. A dry-process apparatus as defined in claim 1 wherein said imaging and developing station includes an imaging point where the dry-process mask film strip is microimaged and a developing point spaced from the imaging point where the microimage in the dry-process mask film is heat developed, and wherein said developing point includes a normally retracted heated plunger and means for advancing the heated plunger into contact with the imaged dry-process mask film strip for heat developing the same.

13. A dry-process apparatus as defined in claim 1 wherein said imaging and developing station includes a camera and a pressure means for maintaining the dry-process mask film strip in flat condition and in proper focal position when it is being imaged.

14. A dry-process apparatus as defined in claim 1 wherein said imaging and developing station includes a normally retracted heated plunger and means for advancing the heated plunger into contact with the imaged dry-process mask film strip for heat developing the same.

15. A dry-process apparatus as defined in claim 14 wherein said heated plunger is metallic and is coated with a low heat conducting substance.

16. A dry-process apparatus as defined in claim 14 wherein said heated plunger has a substantially cylindrical surface transversely of the dry-process mask film strip for contacting the same when the plunger is advanced.

17. A dry-process apparatus as defined in claim 1 wherein said image transferring station also includes means for applying contact pressure between the superimposed dry-process mask film strip and dry-process microform film while the short pulses of electromagnetic energy above the threshold value are being applied.

18. A dry-process apparatus as defined in claim 17 wherein said contact pressure applying means includes a normally retracted plunger and means for advancing the same into contact with the microform film.

* * * * *